J. L. WOODBRIDGE.
SYSTEM OF ELECTRICAL DISTRIBUTION.
APPLICATION FILED APR. 14, 1909.
941,601.
Patented Nov. 30, 1909.
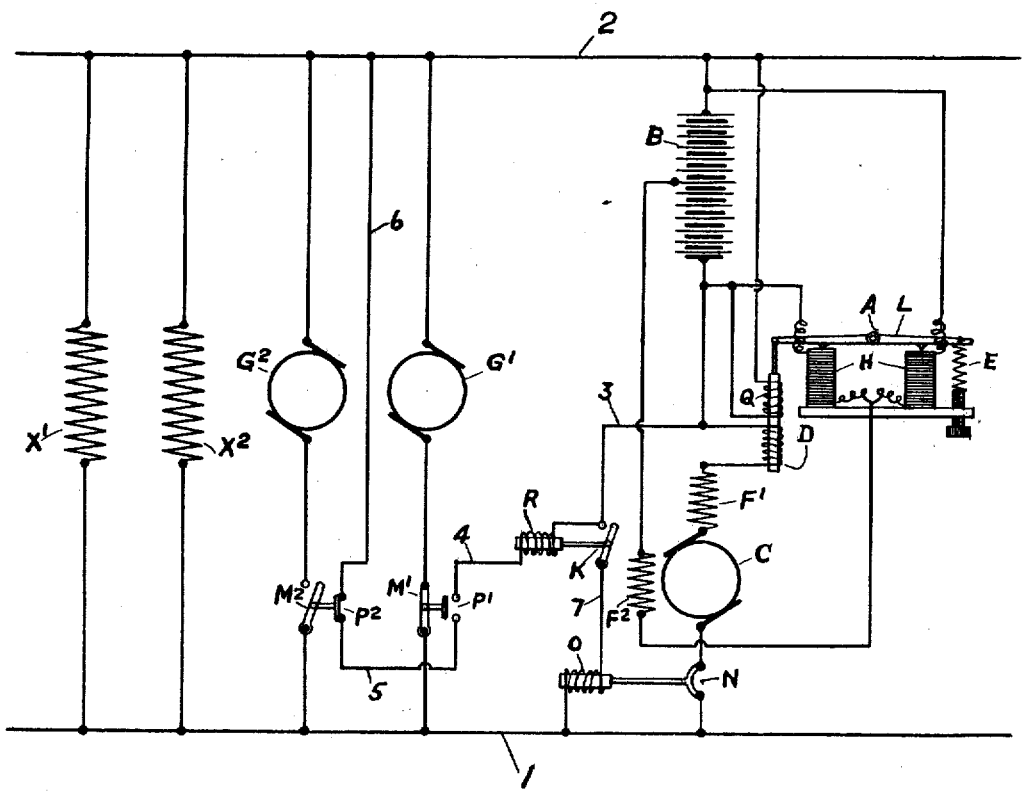
WITNESSES:
INVENTOR
Joseph L. Woodbridge
BY
Augustus B. Stoughton.
ATTORNEY.

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

941,601.

Specification of Letters Patent. Patented Nov. 30, 1909.

Application filed April 14, 1909. Serial No. 489,876.

*To all whom it may concern:*

Be it known that I, JOSEPH L. WOODBRIDGE, a citizen of the United States, and a resident of Philadelphia, in the county of Philadelphia and State of Pennsylvania, have invented a certain new and useful System of Electrical Distribution, of which the following is a specification.

My invention relates to systems of electrical distribution in which a storage battery is connected across a circuit which is subject to wide fluctuations of voltage, and in which it is desired that the storage battery shall not ordinarily charge and discharge with these voltage fluctuations but shall be so arranged as to remain at all times connected to the circuit ready to discharge and take up the load on the circuit in case the normal source of current supplying said circuit should be interrupted. As an example of such a system may be taken the exciter circuit from which current is furnished for exciting the fields of the generators in an electric power plant, the voltage on this exciter circuit being varied automatically to maintain constant voltage at the terminals of the generators with variations of load. It is frequently desired to connect a storage battery across such an exciter circuit, but without the interposition of special regulating devices such a battery would charge whenever the voltage of the exciter circuit rises, and would discharge whenever said voltage falls. The increase in voltage on the exciter circuit would be accompanied by an increase in current output to the field circuits supplied thereby and any additional output for charging the battery would throw an additional load on the source of exciting current which is undesirable. It is however desirable that the battery should always be thus connected to the exciter circuit in order to guard against even a momentary interruption of current in the field circuits.

The object of the present invention is to provide means for controlling the operation of a battery connected as above described, so as to confine its charge and discharge within very narrow and negligible limits under normal conditions and at the same time permit it to discharge without hindrance in case the normal supply of current to the exciting current is interrupted.

The nature of my invention will be more clearly understood by reference to the following description in connection with the accompanying drawing, in which—

1—2 represent the main conductors or busbars of an exciter circuit to which current is supplied by the generators $G^1$ and $G^2$, for exciting the field coils $X^1$ and $X^2$. It is assumed that the voltage across the busbars 1—2 is varied automatically by apparatus such as is well known in the art for accomplishing this purpose. A storage battery B with a booster C in series therewith is connected across the busbars 1—2. The booster C is provided with a series coil $F^1$ which is so connected as to produce a voltage in the booster C opposing the flow of current therethrough. This coil alone might be made of a sufficient number of turns to produce the desired effect in preventing the battery from charging and discharging beyond a certain amount with variations of voltage across the busbars 1—2. In many cases however, the number of turns in the field winding $F^1$ thus required would produce an exceedingly expensive machine. A second coil $F^2$ is therefore shown, the current in which is controlled by the carbon regulator A. This regulator is well known in the art, consisting of two piles of carbon disks H, upon which a lever L, bears in such a manner that pressure on one end of the lever will increase the pressure on one of the piles and decrease that on the other. The pressure at one end of the lever is produced by a solenoid D connected into the battery circuit, the pull of this solenoid being balanced by an adjustable spring E at the other end. A polarizing coil Q is also shown connected across the battery terminals, which serves to polarize the core of the solenoid. Thus any flow of current through the coil D in one direction will pull down on the lever while a flow in the other direction will relieve this pull. The two piles of carbon disks are connected in series across the battery terminals, while the field coil $F^2$ is connected between the intermediate point in the circuit between the two carbon piles and the middle point of the battery. A flow of current from the battery through the coil D in the discharge direction, caused for example by a drop in the voltage across 1—2, will so change the relative pressures on the two carbon piles H H and therefore their relative resistances as to cause a flow of current through the coil F² which will produce a voltage in the booster C adapted to oppose the discharge current from the battery. By properly proportioning the parts of this apparatus a very small charge or discharge current in the battery circuit may be made to produce a voltage in the booster C sufficient to compensate for wide fluctuations of voltage on the circuit 1—2.

Connected around the booster C is shown a circuit 3—7 containing the switch K and a solenoid O. When the switch K is closed this circuit serves to connect conductor 1 directly to the corresponding terminal of the battery thereby short-circuiting the booster C and permitting the battery to discharge directly into the exciter circuit. The switch K is closed by a solenoid R which is connected into a circuit leading from one terminal of the battery by way of conductors 3—4—5—6— and 2 to the other terminal of the battery. There are two interruptions in this circuit at P¹ and P² which may be closed by contacts mechanically connected to the corresponding generator switches M¹ and M² and are thus closed when these generator switches are open. The circuit 4—5—6 is therefore completely closed only when both generator switches M¹ and M² are open. So long as either generator G¹ or G², is supplying the current to the circuit there will be no current in the solenoid R and the switch K will remain open. If, however, both switches M¹ and M² are open so that the normal supply of current from the generators G¹ and G² to the exciter circuit is entirely interrupted, current will flow through the solenoid R closing the switch K and connecting the battery directly across the busbars 1—2 permitting it to furnish the current supplied from those busbars. By closing the switch K a short circuit is established around the booster. This latter is protected from an excessive flow of current under these conditions in two different ways. First, the effect of a flow of current in the field coils F¹ and F² (the latter being produced by current in the solenoid D) will produce a booster voltage tending to oppose this flow of current and limit it to a negligible amount. Second the flow of current in the solenoid O will open the switch N and disconnect the booster.

What I claim is:

1. In combination, an electric circuit, a storage battery and its booster connected thereto, and means responsive to the charge and discharge of the battery and adapted to excite the booster to oppose said charge and discharge.

2. In combination an electric current, a storage battery and its booster connected thereto, means responsive to the charge and discharge of the battery and adapted to excite the booster to oppose said charge and discharge, and means for short-circuiting the booster.

3. In combination, an electric circuit and its source, a storage battery and its booster connected across the circuit, means responsive to the charge and discharge of the battery and adapted to excite the booster to oppose said charge and discharge, and means adapted to short-circuit the booster when the current from the source is interrupted.

4. In combination an electric circuit and its source, a storage battery and its booster connected thereto, means responsive to the battery charge and discharge and adapted to excite the booster to oppose said charge and discharge, and means adapted to short-circuit the booster upon an interruption of the connection from the source to the circuit.

5. In combination an electric circuit, a plurality of generators, suitable switches for connecting the generators to the circuit, a storage battery and its booster connected across the circuit, means responsive to the battery charge and discharge and adapted to excite the booster to oppose said charge and discharge, a switch and appropriate connections for short-circuiting the booster, and means for closing said switch when all the generator switches are open.

6. In combination an electric circuit, a storage battery and its booster connected thereto, means responsive to the charge and discharge of the battery and adapted to excite the booster to oppose said charge and discharge, means adapted to short-circuit the booster, and means responsive to the current in the short-circuit for opening the circuit of the booster.

7. In combination an electric circuit, a storage battery and its booster connected thereto, means responsive to the charge and discharge of the battery and adapted to excite the booster to oppose said charge and discharge, means adapted to short-circuit the booster when the current from the source is interrupted, and means responsive to the current in the short-circuit for opening the circuit of the booster.

8. In combination an electric circuit of varying potential and its source, a storage battery connected thereto, means for preventing the battery from responding to the variations of potential, and means for suppressing the action of the preventive means when the source is disconnected from the circuit.

9. In combination a field coil, an electric circuit of varying potential and its source for supplying current to said field coil, a storage battery connected to the circuit, means for preventing the battery from responding to the variations of potential of the circuit, and means for suppressing the action of the preventive means and permitting the battery to take the load of the field coil when the current from the source is interrupted.

In testimony whereof I have hereunto signed my name.

JOSEPH LESTER WOODBRIDGE.

Witnesses:
CLIFFORD K. CASSEL,
FRANK E. FRENCH.